US012785077B2

(12) United States Patent
Deng et al.

(10) Patent No.: US 12,785,077 B2
(45) Date of Patent: Nov. 3, 2026

(54) NEGATIVE ELECTRODE ACTIVE MATERIAL AND PREPARATION METHOD THEREFOR, SECONDARY BATTERY AND PREPARATION METHOD THEREFOR, AND POWER CONSUMING DEVICE

(71) Applicant: Contemporary Amperex Technology (Hong Kong) Limited, Hong Kong (CN)

(72) Inventors: Yaqian Deng, Ningde (CN); Ning Chen, Ningde (CN); Ruijing Lv, Ningde (CN); Zhipeng Cheng, Ningde (CN); Dongyang Shi, Ningde (CN); Haizu Jin, Ningde (CN); Baiqing Li, Ningde (CN)

(73) Assignee: Contemporary Amperex Technology (Hong Kong) Limited, Hong Kong (CN)

( * ) Notice: Subject to any disclaimer, the term of this patent is extended or adjusted under 35 U.S.C. 154(b) by 84 days.

(21) Appl. No.: 18/976,367

(22) Filed: Dec. 11, 2024

(65) Prior Publication Data

US 2025/0105261 A1 Mar. 27, 2025

Related U.S. Application Data

(63) Continuation of application No. PCT/CN2022/131246, filed on Nov. 11, 2022.

(51) Int. Cl.

*H01M 4/36* (2006.01)
*H01M 4/04* (2006.01)

(Continued)

(52) U.S. Cl.

CPC ......... *H01M 4/364* (2013.01); *H01M 4/0404* (2013.01); *H01M 4/133* (2013.01);

(Continued)

(58) Field of Classification Search

CPC .... H01M 4/364; H01M 4/0404; H01M 4/133; H01M 4/134; H01M 4/386; H01M 4/583;

(Continued)

(56) References Cited

U.S. PATENT DOCUMENTS

2014/0346618 A1* 11/2014 Lahlouh .............. H01M 4/0402 438/49
2018/0083268 A1 3/2018 Huang (Continued)

FOREIGN PATENT DOCUMENTS

CN 104868095 A 8/2015
CN 106415894 A 2/2017

(Continued)

OTHER PUBLICATIONS

Extended European Search Report, mailed Dec. 19, 2025, for corresponding European Patent Application Serial No. 22964821.7.

(Continued)

*Primary Examiner* — James M Erwin
(74) *Attorney, Agent, or Firm* — K&L Gates LLP

(57) ABSTRACT

A negative electrode active material comprises a carbon-based material and a silicon-based material, wherein a first functional group exists on the surface of the carbon-based material, a second functional group exists on the surface of the silicon-based material, and the first functional group has a charge opposite to that of the second functional group.

14 Claims, 2 Drawing Sheets

(51) Int. Cl.

| | |
|---|---|
| ***H01M 4/133*** | (2010.01) |
| ***H01M 4/134*** | (2010.01) |
| ***H01M 4/38*** | (2006.01) |
| ***H01M 4/583*** | (2010.01) |
| ***H01M 10/0587*** | (2010.01) |
| *H01M 4/02* | (2006.01) |

(52) U.S. Cl.
CPC ........... *H01M 4/134* (2013.01); *H01M 4/386* (2013.01); *H01M 4/583* (2013.01); *H01M 10/0587* (2013.01); *H01M 2004/021* (2013.01); *H01M 2004/027* (2013.01)

(58) Field of Classification Search
CPC ....... H01M 10/0587; H01M 2004/021; H01M 2004/027
USPC ........................................................ 429/231.8
See application file for complete search history.

(56) References Cited

U.S. PATENT DOCUMENTS

| | | | | |
|---|---|---|---|---|
| 2021/0213523 | A1 | 7/2021 | Peterson et al. | |
| 2022/0069295 | A1* | 3/2022 | Zettsu .................... | H01M 4/366 |

FOREIGN PATENT DOCUMENTS

| | | | |
|---|---|---|---|
| CN | 110571425 | A | 12/2019 |
| CN | 112164780 | A | 1/2021 |
| CN | 112889165 | A | 6/2021 |
| KR | 20140130578 | A | 11/2014 |

OTHER PUBLICATIONS

Notice of Allowance (with English Machine Translation), mailed Nov. 7, 2025, for corresponding Chinese Patent Application Serial No. 202280093619.4.
International Search Report received in the counterpart international application PCT/CN2022/131246, mailed on Jul. 30, 2023.

* cited by examiner

NEGATIVE ELECTRODE ACTIVE MATERIAL AND PREPARATION METHOD THEREFOR, SECONDARY BATTERY AND PREPARATION METHOD THEREFOR, AND POWER CONSUMING DEVICE

CROSS-REFERENCE TO RELATED APPLICATIONS

This application is a continuation of International Application PCT/CN2022/131246, filed on Nov. 11, 2022, which is incorporated herein by reference in its entirety.

TECHNICAL FIELD

The present application relates to the field of secondary batteries, and more particularly to a negative electrode active material and a preparation method therefor, a secondary battery and a preparation method therefor, and a power consuming device.

BACKGROUND ART

The description herein merely provides background information related to the present application and may not necessarily constitute prior art.

In order to meet the market demand for high-performance power batteries, silicon-based materials with high specific capacity can be used instead of graphite to increase the energy density of batteries. However, the volume expansion of the silicon-based materials is much larger than that of graphite after charging, and polarization thereof is large, which will deteriorate the kinetics of the anode. Therefore, in order to obtain an anode with more balanced performance, it is often necessary to compound silicon-based materials and carbon-based materials into a mixed anode material.

In the traditional technology, silicon-based materials and carbon-based materials are often simply mixed in a physical way, which makes it difficult to avoid the agglomeration of particles of the same type, such as the agglomeration of particles of silicon-based materials or the agglomeration of particles of carbon-based materials. Especially compared with graphite, the agglomeration of silicon particles is more likely to lead to a large concentration difference in the local lithium intercalation of the anode, which in turn leads to the safety problems such as excessive expansion force, poor kinetics and lithium precipitation of the cell, and the most direct manifestation is the decline of the rate performance of the battery.

SUMMARY OF THE INVENTION

According to various embodiments of the present application, a first aspect of the present application provides a negative electrode active material, comprising a carbon-based material and a silicon-based material, wherein a first functional group exists on the surface of the carbon-based material, a second functional group exists on the surface of the silicon-based material, and the first functional group has a charge opposite to that of the second functional group.

In the present application, by modifying the functional groups with opposite charges on the surface of the carbon-based material and the silicon-based material, the same type of material particles can repel each other because of the same charge, which avoids the agglomeration of the same type of particles, while different types of material particles have opposite charges and have a certain electrostatic effect, so that different types of active materials can be uniformly distributed in the whole system, which effectively avoids the problems such as the decline of rate performance caused by uneven particle distribution, uneven thickness caused by local expansion of cells, and lithium precipitation present in the traditional technology.

In some embodiments, the first functional group has a positive charge, and the second functional group has a negative charge. In the case that other conditions remain unchanged, the agglomeration of silicon has more serious negative impact on the performance of a battery than that of the agglomeration of carbon. Therefore, when silicon is negatively charged and carbon is positively charged, the agglomeration between silicon and conductive agent can be effectively avoided, thus further improving the dispersion of the whole system and improving the rate performance of the battery. Especially in the system with a high silicon content, the solution in which silicon is negatively charged and carbon is positively charged will have more obvious advantages.

In some embodiments, the first functional group includes one or more of an amino group, an amide group, a cyano group and a boric acid group.

In some embodiments, the second functional group includes one or more of a carboxyl group, a sulfonic acid group, a hydroxyl group and a halogen group.

An appropriate type of functional group can not only prevent the particles from agglomeration, improve the dispersion of the system, but also will not adversely affect other performances of the battery.

In some embodiments, the mass percentage content of the silicon-based material in the negative electrode active material is 1%-99%; and optionally, the mass percentage content of the silicon-based material in the negative electrode active material is 25%-85%.

In some embodiments, the mass percentage content of the carbon-based material in the negative electrode active material is 1%-99%; and optionally, the mass percentage content of the carbon-based material in the negative electrode active material is 15%-75%.

By controlling the proportion of the silicon-based material and the carbon-based material in the negative electrode active material within a suitable range, the contradiction between the capacity and the rate performance of the battery can be balanced, so that the comprehensive performance of the battery can be maximized; and meanwhile, it can also allow the negative electrode active material to have a suitable overall charge, thus further improving the dispersion stability of the negative electrode slurry when preparing same.

In some embodiments, the carbon-based material comprises small-sized particles and large-sized particles, the small-sized particles have a particle size D50 of 0.2 μm-9.99 μm, and the large-sized particles have a particle size D50 of 10 μm-100 μm. The carbon-based material is obtained by compounding the large-sized particles and the small-sized particles within a certain particle size range, which can effectively reduce the material defects and improve the capacity of the battery without excessively deteriorating the kinetic performance of the battery.

In some embodiments, the mass percentage content of the small-sized particles in the negative electrode active material is 1%-99%, and the mass percentage content of the large-sized particles in the negative electrode active material is 1%-99%; and optionally, the mass percentage content of the small-sized particles in the negative electrode active material is 5%-75%, and the mass percentage content of the large-sized particles in the negative electrode active material is 25%-95%. By controlling the proportion of the large-sized particles and the small-sized particles within a suitable range, a better compounding effect can be achieved therebetween, thereby further improving the rate performance of the battery.

In some embodiments, the silicon-based material has a particle size D50 of 0.2 μm-100 μm; and optionally, the silicon-based material has a particle size D50 of 0.2 μm-30 μm. By controlling the particle size of the silicon-based material within a suitable range, the capacity and kinetic performance of the battery can be balanced, so that the battery has better comprehensive performance.

In some embodiments, the negative electrode active material satisfies at least one of the following conditions (1) to (2):

(1) the concentration of a stable aqueous dispersion of the carbon-based material is 0.1 mg/mL-100 mg/mL; and (2) the concentration of a stable aqueous dispersion of the silicon-based material is 0.1 mg/mL-100 mg/mL;

wherein the stable aqueous dispersion refers to a liquid phase obtained by solid-liquid separation of a dispersion which uses water as a solvent and stands for more than 2 h after preparation without precipitation.

Only by controlling the concentration of the stable aqueous dispersion of the material within a suitable range can the material be charged and have an appropriate amount of electricity, thus helping to further improve the dispersion stability of the system.

A second aspect of the present application provides a method for preparing the negative electrode active material of one or more of the aforementioned embodiments, comprising the steps of:

mixing a carbon-based raw material, a first surfactant and a solvent to prepare a first dispersion, allowing same to stand for more than 2 h, then subjecting same to solid-liquid separation, and retaining a liquid phase to obtain a first stable dispersion; centrifuging the first stable dispersion to obtain a first precipitate; and washing and drying the first precipitate to obtain the carbon-based material;

mixing a silicon-based raw material, a second surfactant and a solvent to prepare a second dispersion, allowing same to stand for more than 2 h, then subjecting same to solid-liquid separation, and retaining a liquid phase to obtain a second stable dispersion; centrifuging the second stable dispersion to obtain a second precipitate; and washing and drying the second precipitate to obtain the silicon-based material; and mixing the carbon-based material and the silicon-based material to prepare the negative electrode active material;

wherein the first surfactant and the second surfactant respectively have opposite charges in the solvent.

A suitable preparation method can allow the raw material to be uniformly charged and have a moderate amount of electricity, thereby further improving the dispersion of the negative electrode active material and reducing the agglomeration.

In some embodiments, the preparation method satisfies at least one of the following conditions (1) to (5):

(1) the carbon-based raw material includes one or more of artificial graphite, natural graphite, soft carbon and hard carbon;

(2) the silicon-based raw material includes one or more of Si and $SiO_x$ (0<x<2);

(3) the first surfactant and the second surfactant are each independently selected from one or more of: dodecylamine, hexadecylamide, dodecanitrile, diglyceride ethoxyborate, sodium cholate, sodium dodecylbenzene sulfonate, decynediol and hexadecyl bromide; an appropriate type of surfactant can bring about appropriate types of functional groups on the surface of the raw materials to provide charges and improve the dispersion of the material without destroying other performances of the battery;

(4) the amount of the first surfactant is 0.1%-40% of the mass of the carbon-based raw material; an appropriate amount of surfactant can allow the surface of the obtained carbon-based material have an appropriate amount of charge uniformly; and (5) the amount of the second surfactant is 0.1%-40% of the mass of the silicon-based raw material, and an appropriate amount of surfactant can allow the surface of the obtained silicon-based material have an appropriate amount of charge uniformly.

A third aspect of the present application provides a secondary battery, comprising a positive electrode plate, a negative electrode plate and a separator provided between the positive electrode plate and the negative electrode plate, wherein the negative electrode plate comprises a negative electrode current collector and a negative electrode active material layer provided on at least one surface of the negative electrode current collector, and the negative electrode active material layer comprises a negative electrode active material of one or more of the aforementioned embodiments.

A fourth aspect of the present application provides a method for preparing a secondary battery, comprising the steps of:

providing a positive electrode current collector, coating a positive electrode slurry on the surface of the positive electrode current collector, and drying and pressing same to obtain a positive electrode plate;

providing a negative electrode current collector, coating a negative electrode slurry on the surface of the negative electrode current collector, and drying and pressing same to obtain a negative electrode plate; wherein the negative electrode slurry comprises a negative electrode active material of one or more of the aforementioned embodiments; and optionally, the negative electrode slurry has a solid content of 30%-70%; and an appropriate solid content of the slurry can better match the technical solution of the present application, thereby further improving the dispersion stability of various particles in the negative electrode active material and avoiding the agglomeration; and laminating or winding the positive electrode plate, the separator and the negative electrode plate to prepare the secondary battery.

A fifth aspect of the present application provides a power consuming device, comprising a secondary battery described above or a secondary battery prepared by the method described above.

BRIEF DESCRIPTION OF THE DRAWINGS

In order to better describe and illustrate those inventive embodiments or examples disclosed herein, reference may be made to one or more of the drawings. Additional details or examples used to describe the drawings should not be considered as limiting the scope of any of the disclosed inventions, the presently described embodiments or examples, and the best modes of these inventions currently understood.

DESCRIPTION OF REFERENCE SIGNS

Figure 1:
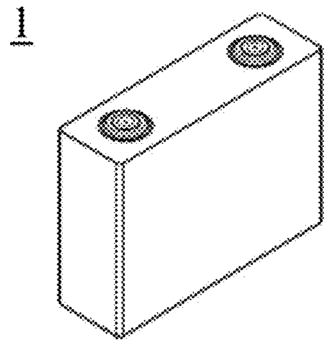
FIG. 1 shows a schematic diagram of a secondary battery according to an embodiment of the present application.

1: secondary battery; 11: housing; 12: electrode assembly; 13: cover plate; 2: power consuming device.

DETAILED DESCRIPTION OF EMBODIMENTS

In order to make the objective, technical solutions, and advantages of the present application clearer, the present application is further described in detail below with reference to the accompanying drawings and the embodiments. It should be understood that the specific embodiments described herein are merely used to explain the present application and are not intended to limit the present application.

Unless otherwise defined, all technical and scientific terms used herein have the same meanings as those commonly understood by those skilled in the art to which the present application belongs. The terms used in the description of the present application are merely for the purpose of describing specific embodiments, and are not intended to limit the present application.

The "ranges" disclosed in the present application are defined in the form of lower and upper limits. A given range is defined by selecting a lower limit and an upper limit, and the selected lower and upper limits defining the boundaries of the particular range. Ranges defined in this manner may be inclusive or exclusive, and may be arbitrarily combined, that is, any lower limit may be combined with any upper limit to form a range. For example, if the ranges 60-120 and 80-110 are listed for a particular parameter, it should be understood that the ranges 60-110 and 80-120 are also contemplated. Additionally, if minimum range values 1 and 2 are listed and maximum range values 3, 4, and 5 are listed, the following ranges are all contemplated: 1-3, 1-4, 1-5, 2-3, 2-4, and 2-5. In the present application, unless stated otherwise, the numerical range "a-b" denotes an abbreviated representation of any combination of real numbers between a and b, where both a and b are real numbers. For example, the numerical range "0-5" means that all the real numbers between "0-5" have been listed herein, and "0-5" is just an abbreviated representation of combinations of these numerical values. In addition, when a parameter is expressed as an integer ≥2, it is equivalent to disclosing that the parameter is, for example, an integer of 2, 3, 4, 5, 6, 7, 8, 9, 10, 11, 12, etc.

All the embodiments and optional embodiments of the present application can be combined with one another to form new technical solutions, unless otherwise stated.

All the technical features and optional technical features of the present application can be combined with one another to form a new technical solution, unless otherwise stated.

Unless otherwise stated, all the steps of the present application may be performed sequentially or randomly, preferably sequentially. For example, the method comprising steps (a) and (b) indicates that the method may comprise steps (a) and (b) performed sequentially, or may also comprise steps (b) and (a) performed sequentially. For example, reference to "the method may further comprise step (c)" indicates that step (c) may be added to the method in any order, e.g., the method may comprise steps (a), (b), and (c), steps (a), (c), and (b), or also steps (c), (a), and (b), etc.

The terms "comprise" and "include" mentioned in the present application are open-ended or may also be closed-ended, unless otherwise stated. For example, "comprise" and "include" may mean that other components not listed may further be comprised or included, or only the listed components may be comprised or included.

In the present application, the term "or" is inclusive unless otherwise specified. For example, the phrase "A or B" means "A, B, or both A and B". More specifically, the condition "A or B" is satisfied by any one of the following: A is true (or present) and B is false (or not present); A is false (or not present) and B is true (or present); or both A and B are true (or present).

The silicon-based material has been gradually used as a negative electrode active material due to their high theoretical specific capacity and lower risk of lithium precipitation to meet the increasing market demand for high-capacity secondary batteries. However, the silicon-based material generally needs to be mixed with a carbon-based material such as graphite because of the high expansion coefficient and large polarization thereof, so as to balance the contradiction between the specific capacity and the expansion coefficient and improve the comprehensive performance of the battery. However, when a silicon-based material and a carbon-based material are used in combination, they are generally difficult to be dispersed uniformly, especially for the silicon-based material, which has a significantly negative impact on the performance of the battery after agglomeration, easily leading to problems such as local excessive expansion and reduced rate performance.

In view of the above-mentioned problems, a first aspect of the present application provides a negative electrode active material, comprising a carbon-based material and a silicon-based material, wherein a first functional group exists on the surface of the carbon-based material, a second functional group exists on the surface of the silicon-based material, and the first functional group has a charge opposite to that of the second functional group.

In the present application, by modifying the functional groups with opposite charges on the surface of the carbon-based material and the silicon-based material, the same type of material particles can repel each other because of the same charge, which avoids the agglomeration of the same type of particles, while different types of material particles have opposite charges and have a certain electrostatic effect, so that different types of active materials can be uniformly distributed in the whole system, which effectively avoids the problems such as the decline of rate performance caused by uneven particle distribution, excessive expansion, and lithium precipitation present in the traditional technology.

In some embodiments, the first functional group has a positive charge, and the second functional group has a negative charge. In the case that other conditions remain unchanged, the agglomeration of silicon has more serious negative impact on the performance of a battery than that of the agglomeration of carbon. Therefore, when silicon is negatively charged and carbon is positively charged, the agglomeration between silicon and conductive agent can be effectively avoided, thus further improving the dispersion of the whole system and improving the rate performance of the battery. Especially in the system with a high silicon content (the mass percentage content of the silicon-based material is greater than 20%), the solution in which silicon is negatively charged and carbon is positively charged will have more obvious advantages.

In some embodiments, the first functional group includes one or more of an amino group, an amide group, a cyano group and a boric acid group.

In some embodiments, the second functional group includes one or more of a carboxyl group, a sulfonic acid group, a hydroxyl group and a halogen group.

An appropriate type of functional group can not only prevent the particles from agglomeration, improve the dispersion of the system, but also will not adversely affect other performances of the battery. It can be understood that the existence of functional groups is to enable the negative electrode material particles to be charged. Therefore, the specific substituents on the surface of the material are not limited, as long as they contain the above-mentioned functional groups and can be charged normally. For example, the amino group may be a single amino group, an amino group existing in —$CH_2NH_2$, or an amino group existing in —$COOCH_2NH_2$. For example, the carboxyl group may be a single carboxyl group, or —$CH_2COOH$. For example, the halogen group may be a single fluorine atom or a perfluoroalkyl group. In the present application, the halogen group includes one or more of —F, —Cl and —Br.

In some embodiments, the mass percentage content of the silicon-based material in the negative electrode active material is 1%-99%; and optionally, the mass percentage content of the silicon-based material in the negative electrode active material may be, for example, 25%-85%, and may also be, for example, 5%, 10%, 15%, 20%, 25%, 30%, 35%, 40%, 45%, 50%, 55%, 60%, 65%, 70%, 75%, 80%, 85%, 90% or 95%.

In some embodiments, the mass percentage content of the carbon-based material in the negative electrode active material is 1%-99%; and optionally, the mass percentage content of the carbon-based material in the negative electrode active material may be, for example, 15%-75%, and may also be, for example, 5%, 10%, 15%, 20%, 25%, 30%, 35%, 40%, 45%, 50%, 55%, 60%, 65%, 70%, 75%, 80%, 85%, 90% or 95%.

By controlling the proportion of the silicon-based material and the carbon-based material in the negative electrode active material within a suitable range, the contradiction between the capacity and the rate performance of the battery can be balanced, so that the comprehensive performance of the battery can be maximized; and meanwhile, it can also allow the negative electrode active material to have a suitable overall charge, thus further improving the dispersion stability of the negative electrode slurry when preparing same.

In some embodiments, the carbon-based material comprises small-sized particles and large-sized particles, wherein the small-sized particles have a particle size D50 of 0.2 μm-9.9 μm, and the large-sized particles have a particle size D50 of 10 μm-100 μm. Optionally, the particle size D50 of the small-sized particles may also be, for example 0.5 μm, 1 μm, 1.5 μm, 2 μm, 2.5 μm, 3 μm, 3.5 μm, 4 μm, 4.5 μm, 5 μm, 5.5 μm, 6 μm, 6.5 μm, 7 μm, 7.5 μm, 8 μm, 8.5 μm, 9 μm or 9.5 μm. Optionally, the particle size D50 of the large-sized particles may also be, for example 15 μm, 20 μm, 25 μm, 30 μm, 35 μm, 40 μm, 45 μm, 50 μm, 55 μm, 60 μm, 65 μm, 70 μm, 75 μm, 80 μm, 85 μm, 90 μm or 95 μm. The carbon-based material is obtained by compounding the large-sized particles and the small-sized particles within a certain particle size range, which can effectively reduce the material defects and improve the capacity of the battery without excessively deteriorating the kinetic performance of the battery.

In the present application, D50 refers to the particle size when the cumulative distribution number of particles reaches 50% in the particle size cumulative distribution curve, and the physical meaning thereof is that the number of particles with a particle size smaller than (or larger than) this particle size value accounts for 50% respectively. As an example, D50 can be conveniently measured with a laser particle size analyzer, such as Mastersizer 2000E laser particle size analyzer of Malvern Instruments Co., Ltd., UK, with reference to GB/T 19077-2016 Particle Size Distribution—Laser Diffraction Method.

In some embodiments, the mass percentage content of the small-sized particles in the negative electrode active material is 1%-99%, and the mass percentage content of the large-sized particles in the negative electrode active material is 1%-99%; and optionally, the mass percentage content of the small-sized particles in the negative electrode active material is 5%-75%, and the mass percentage content of the large-sized particles in the negative electrode active material is 25%-95%. The mass percentage content of the small-sized particles in the negative electrode active material may also be, for example, 5%, 10%, 15%, 20%, 25%, 30%, 35%, 40%, 45%, 50%, 55%, 60%, 65%, 70%, 75%, 80%, 85%, 90% or 95%. The mass percentage content of the large-sized particles in the negative electrode active material may also be, for example, 5%, 10%, 15%, 20%, 25%, 30%, 35%, 40%, 45%, 50%, 55%, 60%, 65%, 70%, 75%, 80%, 85%, 90% or 95%. By controlling the proportion of the large-sized particles and the small-sized particles within a suitable range, a better compounding effect can be achieved therebetween, thereby further improving the rate performance of the battery.

In some embodiments, the silicon-based material has a particle size D50 of 0.2 μm-100 μm; Optionally, the particle size D50 of the silicon-based material is 0.2 μm-30 μm, and the particle size D50 of the silicon-based material may also be, for example 5 μm, 10 μm, 15 μm, 20 μm, 25 μm, 30 μm, 35 μm, 40 μm, 45 μm, 50 μm, 55 μm, 60 μm, 65 μm, 70 μm, 75 μm, 80 μm, 85 μm, 90 μm or 95 μm. By controlling the particle size of the silicon-based material within a suitable range, the capacity and kinetic performance of the battery can be balanced, so that the battery has better comprehensive performance.

In some embodiments, the negative electrode active material satisfies at least one of the following conditions (1) to (2):

(1) the concentration of a stable aqueous dispersion of the carbon-based material is 0.1 mg/mL-100 mg/mL; and the concentration of the stable aqueous dispersion of the carbon-based material may also be, for example 10 mg/mL, 20 mg/mL, 30 mg/mL, 40 mg/mL, 50 mg/mL, 60 mg/mL, 70 mg/mL, 80 mg/mL or 90 mg/mL; and (2) the concentration of a stable aqueous dispersion of the silicon-based material is 0.1 mg/mL-100 mg/mL; and the concentration of the stable aqueous dispersion of the silicon-based material may also be, for example 10 mg/mL, 20 mg/mL, 30 mg/mL, 40 mg/mL, 50 mg/mL, 60 mg/mL, 70 mg/mL, 80 mg/mL or 90 mg/mL;

wherein the stable aqueous dispersion refers to a liquid phase obtained by solid-liquid separation of a dispersion which uses water as a solvent and stands for more than 2 h after preparation without precipitation.

Only by controlling the concentration of the stable aqueous dispersion of the material within a suitable range can the material be charged and have an appropriate amount of electricity, thus helping to further improve the dispersion stability of the system.

A second aspect of the present application provides a method for preparing the negative electrode active material of one or more of the aforementioned embodiments, comprising the steps of:

mixing a carbon-based raw material, a first surfactant and a solvent to prepare a first dispersion, allowing same to stand for more than 2 h, then subjecting same to solid-liquid separation, and retaining a liquid phase to obtain a first stable dispersion; centrifuging the first stable dispersion to obtain a first precipitate; and washing and drying the first precipitate to obtain the carbon-based material;

mixing a silicon-based raw material, a second surfactant and a solvent to prepare a second dispersion, allowing same to stand for more than 2 h, then subjecting same to solid-liquid separation, and retaining a liquid phase to obtain a second stable dispersion; centrifuging the second stable dispersion to obtain a second precipitate; and washing and drying the second precipitate to obtain the silicon-based material; and mixing the carbon-based material and the silicon-based material to prepare the negative electrode active material;

wherein the first surfactant and the second surfactant respectively have opposite charges in the solvent.

A suitable preparation method can allow the raw material to be uniformly charged and have a moderate amount of electricity, thereby further improving the dispersion of the negative electrode active material and reducing the agglomeration.

In some embodiments, the preparation method satisfies at least one of the following conditions (1) to (5):

(1) the carbon-based raw material includes one or more of artificial graphite, natural graphite, soft carbon and hard carbon;

(2) the silicon-based raw material includes one or more of Si and $SiO_x$ ($0<x<2$);

(3) the first surfactant and the second surfactant are each independently selected from one or more of: dodecylamine, hexadecylamide, dodecanitrile, diglyceride ethoxyborate, sodium cholate, sodium dodecylbenzene sulfonate, decynediol and hexadecyl bromide; an appropriate type of surfactant can bring about appropriate types of functional groups on the surface of the raw materials to provide charges and improve the dispersion of the material without destroying other performances of the battery; but the available surfactants are not limited to those listed above, which are only representatives of some easily available and effective surfactants;

(4) the amount of the first surfactant is 0.1%-40% of the mass of the carbon-based raw material; the amount of the first surfactant may also be, for example 5%, 10%, 15%, 20%, 25%, 30% or 35% of the mass of the carbon-based raw material; and an appropriate amount of surfactant can allow the surface of the obtained carbon-based material have an appropriate amount of charge uniformly; and (5) the amount of the second surfactant is 0.1%-40% of the mass of the silicon-based raw material; the amount of the second surfactant may also be, for example 5%, 10%, 15%, 20%, 25%, 30% or 35% of the mass of the silicon-based raw material; and an appropriate amount of surfactant can allow the surface of the obtained silicon-based material have an appropriate amount of charge uniformly.

A third aspect of the present application provides a secondary battery, comprising a positive electrode plate, a negative electrode plate and a separator provided between the positive electrode plate and the negative electrode plate, wherein the negative electrode plate comprises a negative electrode current collector and a negative electrode active material layer provided on at least one surface of the negative electrode current collector, and the negative electrode active material layer comprises a negative electrode active material of one or more of the aforementioned embodiments.

A fourth aspect of the present application provides a method for preparing a secondary battery, comprising the steps of:

providing a positive electrode current collector, coating a positive electrode slurry on the surface of the positive electrode current collector, drying and pressing same to obtain a positive electrode plate;

providing a negative electrode current collector, coating a negative electrode slurry on the surface of the negative electrode current collector, drying and pressing same to obtain a negative electrode plate; wherein the negative electrode slurry comprises a negative electrode active material of one or more of the aforementioned embodiments; optionally, the negative electrode slurry has a solid content of 30%-70%; the solid content of the negative electrode slurry may also be, for example 35%, 40%, 45%, 50%, 55%, 60% or 65%; and an appropriate solid content of the slurry can better match the technical solution of the present application, thereby further improving the dispersion stability of various particles in the negative electrode active material and avoiding the agglomeration; and laminating or winding the positive electrode plate, the separator and the negative electrode plate to prepare the secondary battery.

A fifth aspect of the present application provides a power consuming device, comprising a secondary battery described above or a secondary battery prepared by the method described above.

In addition, the secondary battery and the power consuming device of the present application will be described below with reference to the drawings as appropriate.

In one embodiment of the present application, a secondary battery is provided.

Typically, a secondary battery comprises a positive electrode plate, a negative electrode plate, an electrolyte and a separator. During the charge/discharge of the battery, active ions are intercalated and de-intercalated back and forth between a positive electrode plate and a negative electrode plate. The electrolyte functions to conduct ions between the positive electrode plate and the negative electrode plate. The separator is provided between the positive electrode plate and the negative electrode plate and mainly functions to prevent the positive and negative electrodes from short-circuiting while enabling ions to pass through.

Positive Electrode Plate

The positive electrode plate comprises a positive electrode current collector and a positive electrode film layer provided on at least one surface of the positive electrode current collector, the positive electrode film layer comprising a positive electrode active material.

As an example, the positive electrode current collector has two surfaces opposite in its own thickness direction, and the positive electrode film layer is provided on either or both of opposite surfaces of the positive electrode current collector.

In some embodiments, the positive electrode current collector may be a metal foil or a composite current collector. For example, as a metal foil, an aluminum foil can be used. The composite current collector may comprise a polymer material base layer and a metal layer formed on at least one surface of the polymer material base layer. The composite current collector can be formed by forming a metal material (aluminum, an aluminum alloy, nickel, a nickel alloy, titanium, a titanium alloy, silver and a silver alloy, etc.) on a polymer material substrate (such as polypropylene (PP), polyethylene terephthalate (PET), polybutylene terephthalate (PBT), polystyrene (PS), polyethylene (PE), etc.).

In some embodiments, the positive electrode active material can be a positive electrode active material known in the art for batteries. As an example, the positive electrode active material may comprise at least one of the following materials: lithium-containing phosphates of an olivine structure, lithium transition metal oxides, and their respective modified compounds. However, the present application is not limited to these materials, and other conventional materials that can be used as positive electrode active materials for batteries may also be used. These positive electrode active materials may be used alone or in combination of two or more. Herein, examples of lithium transition metal oxides may include, but are not limited to, at least one of lithium cobalt oxide (e.g., $LiCoO_2$), lithium nickel oxide (e.g., $LiNiO_2$), lithium manganese oxide (e.g., $LiMnO_2$, $LiMn_2O_4$), lithium nickel cobalt oxide, lithium manganese cobalt oxide, lithium nickel manganese oxide, lithium nickel cobalt manganese oxide (e.g., $LiNi_{1/3}Co_{1/3}Mn_{1/3}O_2$ (also referred to as $NCM_{333}$), $LiNi_{0.5}Co_{0.2}Mn_{0.3}O_2$ (also referred to as $NCM_{523}$), $LiNi_{0.5}Co_{0.25}Mn_{0.25}O_2$ (also referred to as $NCM_{211}$), $LiNi_{0.6}Co_{0.2}Mn_{0.2}O_2$ (also referred to as $NCM_{622}$), $LiNi_{0.8}Co_{0.1}Mn_{0.1}O_2$ (also referred to as $NCM_{811}$)), lithium nickel cobalt aluminum oxide (e.g., $LiNi_{0.85}Co_{0.15}Al_{0.05}O_2$), and modified compounds thereof, etc. Examples of lithium-containing phosphates of olivine structure may include, but are not limited to, at least one of lithium iron phosphate (e.g., $LiFePO_4$ (also referred to as LFP)), lithium iron phosphate and carbon composites, lithium manganese phosphate (e.g., $LiMnPO_4$), lithium manganese phosphate and carbon composites, lithium iron manganese phosphate, and lithium iron manganese phosphate and carbon composites.

In some embodiments, the positive electrode film layer further optionally comprises a binder. As an example, the binder may include at least one of polyvinylidene fluoride (PVDF), polytetrafluoroethylene (PTFE), vinylidene fluoride-tetrafluoroethylene-propylene terpolymer, vinylidene fluoride-hexafluoropropylene-tetrafluoroethylene terpolymer, tetrafluoroethylene-hexafluoropropylene copolymer, and fluorine-containing acrylate resin.

In some embodiments, the positive electrode film layer also optionally comprises a conductive agent. As an example, the conductive agent may include at least one of superconducting carbon, acetylene black, carbon black, Ketjen black, carbon dots, carbon nanotubes, graphene, and carbon nanofibers.

In some embodiments, the positive electrode plate can be prepared as follows: dispersing the above-mentioned components for preparing the positive electrode plate, such as a positive electrode active material, a conductive agent, a binder and any other components, in a solvent (e.g., N-methyl pyrrolidone) to form a positive electrode slurry; and coating the positive electrode current collector with the positive electrode slurry, followed by the procedures such as drying and cold pressing, so as to obtain the positive electrode plate.

Negative Electrode Plate

The negative electrode plate comprises a negative electrode current collector and a negative electrode film layer provided on at least one surface of the negative electrode current collector, wherein the negative electrode film layer comprises a negative electrode active material including the negative electrode active material of the first aspect of the present application.

As an example, the negative electrode current collector has two surfaces opposite in its own thickness direction, and the negative electrode film layer is provided on either or both of the two opposite surfaces of the negative electrode current collector.

In some embodiments, the negative electrode current collector may be a metal foil or a composite current collector. For example, as a metal foil, a copper foil can be used. The composite current collector may comprise a polymer material base layer and a metal layer formed on at least one surface of the polymer material substrate. The composite current collector can be formed by forming a metal material (copper, a copper alloy, nickel, a nickel alloy, titanium, a titanium alloy, silver and a silver alloy, etc.) on a polymer material substrate (e.g., polypropylene (PP), polyethylene terephthalate (PET), polybutylene terephthalate (PBT), polystyrene (PS), polyethylene (PE), etc.).

In some embodiments, in addition to the negative electrode active material of the first aspect of the present application, the negative electrode active material of the present application may further include the negative electrode active materials known in the art for batteries, such as: artificial graphite, natural graphite, soft carbon, hard carbon, a silicon-based material, a tin-based material and lithium titanate, etc. The silicon-based material may be selected from at least one of elemental silicon, silicon oxides, silicon carbon composites, silicon nitrogen composites, and silicon alloys. The tin-based material may be selected from at least one of elemental tin, tin oxides, and tin alloys. However, the present application is not limited to these materials, and other conventional materials that can be used as negative electrode active materials for batteries can also be used. These negative electrode active materials may be used alone or as a combination of two or more.

In some embodiments, the negative electrode film layer may optionally comprise a binder. The binder may be selected from at least one of a butadiene styrene rubber (SBR), polyacrylic acid (PAA), sodium polyacrylate (PAAS), polyacrylamide (PAM), polyvinyl alcohol (PVA), sodium alginate (SA), polymethacrylic acid (PMAA) and carboxymethyl chitosan (CMCS).

In some embodiments, the negative electrode film layer may optionally comprise a conductive agent. The conductive agent may be selected from at least one of superconductive carbon, acetylene black, carbon black, ketjenblack, carbon dots, carbon nanotubes, graphene, and carbon nanofibers.

In some embodiments, the negative electrode film layer may optionally comprise other auxiliary agents, such as thickener (e.g., sodium carboxymethyl cellulose (CMC-Na)), etc.

In some embodiments, the negative electrode plate can be prepared as follows: dispersing the above-mentioned components for preparing the negative electrode plate, such as a negative electrode active material, a conductive agent, a binder and any other components, in a solvent (e.g., deionized water) to form a negative electrode slurry; and coating a negative electrode current collector with the negative electrode slurry, followed by procedures such as drying and cold pressing, so as to obtain the negative electrode plate.

Electrolyte

The electrolyte functions to conduct ions between the positive electrode plate and the negative electrode plate. The type of the electrolyte is not specifically limited in the present application and can be selected as necessary. For example, the electrolyte may be in a liquid state, a gel state or an all-solid state.

In some embodiments, an electrolyte solution is used as the electrolyte. The electrolyte solution comprises an electrolyte salt and a solvent.

In some embodiments, the electrolyte salt may be selected from at least one of lithium hexafluorophosphate, lithium tetrafluoroborate, lithium perchlorate, lithium hexafluoroarsenate, lithium bisfluorosulfonimide, lithium bistrifluoromethanesulfonimide, lithium trifluoromethanesulfonate, lithium difluorophosphate, lithium difluorooxalate borate, lithium dioxalate borate, lithium difluorodioxalate phosphate and lithium tetrafluorooxalate phosphate.

In some embodiments, the solvent may be selected from at least one of ethylene carbonate, propylene carbonate, ethyl methyl carbonate, diethyl carbonate, dimethyl carbonate, dipropyl carbonate, methyl propyl carbonate, ethyl propyl carbonate, butylene carbonate, fluoroethylene carbonate, methyl formate, methyl acetate, ethyl acetate, propyl acetate, methyl propionate, ethyl propionate, propyl propionate, methyl butyrate, ethyl butyrate, 1,4-butyrolactone, sulfolane, dimethyl sulfone, ethyl methyl sulfone, and diethyl sulfone.

In some embodiments, the electrolyte solution may optionally comprise an additive. For example, the additive may include a negative electrode film-forming additive and a positive electrode film-forming additive, and may further include an additive that can improve certain performances of the battery, such as an additive that improves the overcharge performance of the battery, or an additive that improves the high temperature or low-temperature performance of the battery.

Separator

In some embodiments, the secondary battery further comprises a separator. The type of the separator is not particularly limited in the present application, and any well-known porous-structure separator with good chemical stability and mechanical stability may be selected.

In some embodiments, the material of the separator may be selected from at least one of glass fibers, non-woven fabrics, polyethylene, polypropylene and polyvinylidene fluoride. The separator may be either a single-layer film or a multi-layer composite film, and is not limited particularly. When the separator is a multi-layer composite film, the materials in the respective layers may be same or different, which is not limited particularly.

In some embodiments, an electrode assembly may be formed by a positive electrode plate, a negative electrode plate and a separator by a winding process or a lamination process.

In some embodiments, the secondary battery may comprise an outer package. The outer package may be used to encapsulate the above-mentioned electrode assembly and electrolyte.

In some embodiments, the outer package of the secondary battery can be a hard housing, for example, a hard plastic housing, an aluminum housing, a steel housing, etc. The outer package of the secondary battery may also be a soft bag, such as a pouch-type soft bag. The material of the soft bag may be plastics, and the examples of plastics may comprise polypropylene, polybutylene terephthalate, polybutylene succinate, etc.

The shape of the secondary battery is not particularly limited in the present application and may be cylindrical, square or of any other shape. For example, FIG. 1 shows a secondary battery 1 with a square structure as an example.

Figure 2:
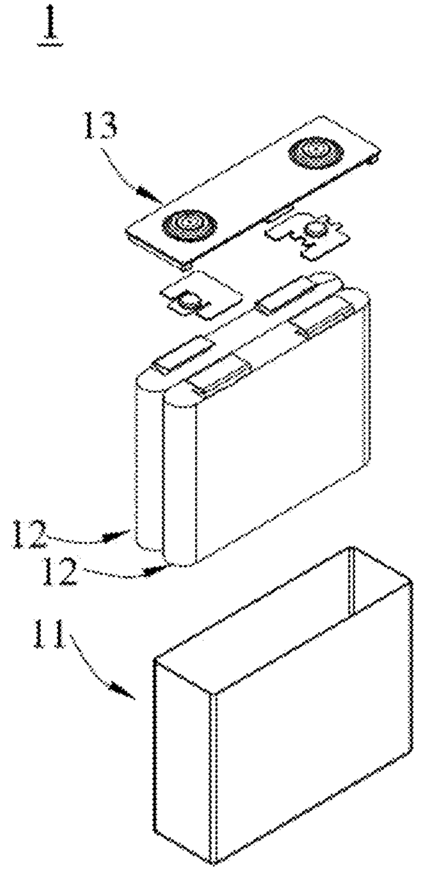
FIG. 2 shows an exploded view of the secondary battery according to an embodiment of the present application as shown in FIG. 1.

In some embodiments, referring to FIG. 2, the outer package may comprise a housing 11 and a cover plate 13. Herein, the housing 11 may comprise a bottom plate and side plates connected to the bottom plate, and the bottom plate and the side plates enclose to form an accommodating cavity. The housing 11 has an opening in communication with the accommodating cavity, and the cover plate 13 can cover the opening to close the accommodating cavity. The positive electrode plate, the negative electrode plate and the separator can be manufactured into an electrode assembly 12 by means of a winding process or a lamination process. The electrode assembly 12 is encapsulated in the accommodating cavity. An electrolyte solution is infiltrated into the electrode assembly 12. The number of the electrode assemblies 12 contained in the secondary battery 1 may be one or more, and can be selected by those skilled in the art according to actual requirements.

In some embodiments, the secondary battery can be assembled into a battery module, and the number of the secondary batteries contained in the battery module may be one or more, and the specific number can be selected by those skilled in the art according to the application and capacity of the battery module.

In some embodiments, the above-mentioned battery module may be further assembled into a battery pack, the number of the battery modules contained in the battery pack may be one or more, and the specific number can be selected by those skilled in the art according to the application and capacity of the battery pack.

In addition, the present application further provides a power consuming device. The power consuming device comprises at least one of the secondary battery, the battery module, or the battery pack provided by the present application. The secondary battery, battery module or battery pack can be used as a power source of the power consuming device or as an energy storage unit of the power consuming device. The power consuming device may include a mobile device, an electric vehicle, an electric train, ship, and satellite, an energy storage system, and the like, but is not limited thereto. Herein, the mobile device may be, for example, a mobile phone, a laptop computer, etc; and the electric vehicle may be, for example, a pure electric vehicle, a hybrid electric vehicle, a plug-in hybrid electric vehicle, an electric bicycle, an electric scooter, an electric golf cart, an electric truck, etc., but is not limited thereto.

As for the power consuming device, the secondary battery, battery module or battery pack can be selected according to the usage requirements thereof.

Figure 3:
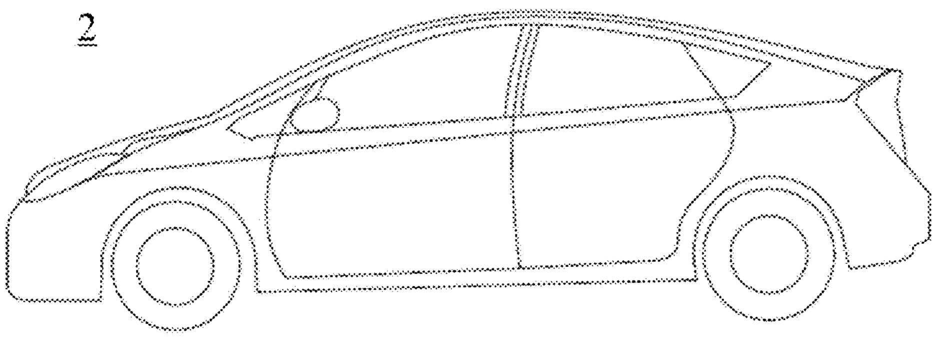
FIG. 3 shows a schematic diagram of a power consuming device according to an embodiment of the present application in which a secondary battery is used as a power source.

FIG. 3 shows a power consuming device 2 as an example. The power consuming device may be a pure electric vehicle, a hybrid electric vehicle, a plug-in hybrid electric vehicle, etc.

As another example, the device may be a mobile phone, a tablet computer, a laptop computer, etc.

Example 1

(1) Preparation of Positive Electrode Plate

A positive electrode active material of nickel-cobalt-manganese ternary material (NCM811), a conductive agent of acetylene black and a binder of polyvinylidene fluoride (PVDF) were uniformly mixed in a mass ratio of 97:2:1 and then added to a solvent of NMP to prepare a positive electrode slurry; and the positive electrode slurry was uniformly coated onto a positive electrode current collector of aluminum foil, dried at 85° C. and then cold pressed, followed by die cutting and slitting to prepare the positive electrode plate of the lithium ion battery.

(2) Preparation of Negative Electrode Plate a. Preparation of Negative Electrode Active Material:

artificial graphite (by mass percentage content, 40% of small-sized particles with a particle size D50 of 5 μm and 60% of large-sized particles with a particle size D50 of 25 μm) and dodecylamine were mixed in a mass ratio of 100:20, water was used as a solvent to prepare a dispersion, and the dispersion was allowed to stand for 2 h and then subjected to solid-liquid separation to retain the liquid phase, which was a stable aqueous dispersion with a concentration of 50 mg/mL; the stable aqueous dispersion was centrifuged at a rotational speed of 10,000 rpm and was subjected to solid-liquid separation to retain the solid phase, and a carbon-based material with amino groups on the surface thereof was obtained, which was positively charged;

Si (with a particle size D50 of 5 μm) and sodium cholate were mixed in a mass ratio of 100:20, water was used as a solvent to prepare a dispersion, and the dispersion was allowed to stand for 2 h and then subjected to solid-liquid separation to retain the liquid phase, which was a stable aqueous dispersion with a concentration of 50 mg/mL; the stable aqueous dispersion was centrifuged at a rotational speed of 10,000 rpm and was subjected to solid-liquid separation to retain the solid phase, and a silicon-based material with carboxyl groups on the surface thereof was obtained, which was negatively charged;

the carbon-based material with amino groups on the surface thereof and the silicon-based material with carboxyl groups on the surface thereof were mixed in a mass ratio of 50:50 to obtain a negative electrode active material; and b. the negative electrode active material prepared in step a, a conductive agent of acetylene black, a thickener of sodium hydroxymethylcellulose (CMC) and a binder of styrene-butadiene rubber (SBR) were added into a solvent of water in a mass ratio of 96:2:1:1, and mixed until uniform to prepare a negative electrode slurry with a solid content of 50%; and the negative electrode slurry was uniformly coated onto a negative electrode current collector of copper foil, dried at 85° C. and then cold pressed to prepare a negative electrode plate of the lithium ion battery.

(3) Preparation of Separator

A polyethylene microporous film was used as a substrate of a porous separator, and inorganic alumina powder, polyvinyl pyrrolidone and an acetone solvent were uniformly mixed in a weight ratio of 3:1.5:5.5 to prepare a slurry, which was then coated onto one side of the substrate and dried to obtain the separator.

(4) Preparation of Electrolyte Solution

Lithium hexafluorophosphate was dissolved in a mixed solvent of ethylene carbonate, dimethyl carbonate and methyl ethyl carbonate (the volume ratio of ethylene carbonate, dimethyl carbonate and methyl ethyl carbonate was 1:2:1) to obtain an electrolyte solution of the lithium ion battery.

(5) Preparation of Lithium Ion Battery

The above positive electrode plate, the negative electrode plate and the separator were wound to obtain an electrode assembly, followed by procedures such as packaging, liquid injection, formation and degassing to prepare a lithium ion battery, wherein N/P=1, and the designed rated capacity of the battery is 100 Ah.

Example 2

Basically same as example 1, except that in step (2) a, artificial graphite was mixed with sodium cholate to prepare a carbon-based material with carboxyl groups on the surface thereof, which was negatively charged; and Si was mixed with dodecylamine to prepare a silicon-based material with amino groups on the surface thereof, which was positively charged.

Example 3

Basically same as example 1, except that in step (2) a, the carbon-based material with amino groups on the surface thereof and the silicon-based material with carboxyl groups on the surface thereof were mixed in a mass ratio of 97:3 to obtain a negative electrode active material.

Example 4

Basically same as example 1, except that in step (2) a, the carbon-based material with amino groups on the surface thereof and the silicon-based material with carboxyl groups on the surface thereof were mixed in a mass ratio of 20:80 to obtain a negative electrode active material.

Example 5

Basically same as example 1, except that in step (2) a, all the artificial graphite was small-sized particles with a particle size D50 of 5 μm.

Example 6

Basically same as example 1, except that in step (2) a, all the artificial graphite was large-sized particles with a particle size D50 of 25 μm.

Example 7

Basically same as example 1, except that in step (2) a, the particle size D50 of Si was 0.2 μm.

Example 8

Basically same as example 1, except that in step (2) a, the particle size D50 of Si was 100 μm.

Example 9

Basically same as example 1, except that in step (2) a, natural graphite (by mass percentage content, 80% of small-sized particles with a particle size D50 of 1 μm and 20% of large-sized particles with a particle size D50 of 95 μm) and diglyceride ethoxyborate were mixed in a mass ratio of 100:20, water was used as a solvent to prepare a dispersion, and the dispersion was allowed to stand for 2 h and then subjected to solid-liquid separation to retain the liquid phase, which was a stable aqueous dispersion with a concentration of 50 mg/mL; the stable aqueous dispersion was centrifuged at a rotational speed of 10,000 rpm and was subjected to solid-liquid separation to retain the solid phase, and a carbon-based material with boric acid groups on the surface thereof was obtained, which was positively charged;

Si (with a particle size D50 of 30 μm) and sodium dodecylbenzene sulfonate were mixed in a mass ratio of 100:20, water was used as a solvent to prepare a dispersion, and the dispersion was allowed to stand for 2 h and then subjected to solid-liquid separation to retain the liquid phase, which was a stable aqueous dispersion with a concentration of 50 mg/mL; the stable aqueous dispersion was centrifuged at a rotational speed of 10,000 rpm and was subjected to solid-liquid separation to retain the solid phase, and a silicon-based material with sulfonic acid groups on the surface thereof was obtained, which was negatively charged;

the carbon-based material with boric acid groups on the surface thereof and the silicon-based material with sulfonic acid groups on the surface thereof were mixed in a mass ratio of 5:95 to obtain a negative electrode active material.

Example 10

Basically same as example 1, except that in step (2) a, hard carbon (by mass percentage content, 50% of small-sized particles with a particle size D50 of 5 μm and 50% of large-sized particles with a particle size D50 of 50 μm) and hexadecylamide were mixed in a mass ratio of 100:20, water was used as a solvent to prepare a dispersion, and the dispersion was allowed to stand for 2 h and then subjected to solid-liquid separation to retain the liquid phase, which was a stable aqueous dispersion with a concentration of 50 mg/mL; the stable aqueous dispersion was centrifuged at a rotational speed of 10,000 rpm and was subjected to solid-liquid separation to retain the solid phase, and a carbon-based material with amide groups on the surface thereof was obtained, which was positively charged;

Si (with a particle size D50 of 50 μm) and hexadecyl bromide were mixed in a mass ratio of 100:20, water was used as a solvent to prepare a dispersion, and the dispersion was allowed to stand for 2 h and then subjected to solid-liquid separation to retain the liquid phase, which was a stable aqueous dispersion with a concentration of 50 mg/mL; the stable aqueous dispersion was centrifuged at a rotational speed of 10,000 rpm and was subjected to solid-liquid separation to retain the solid phase, and a silicon-based material with bromine atoms on the surface thereof was obtained, which was negatively charged;

the carbon-based material with amide groups on the surface thereof and the silicon-based material with bromine atoms on the surface thereof were mixed in a mass ratio of 70:30 to obtain a negative electrode active material.

Comparative Example 1

Basically same as example 1, except that in step (2) a, artificial graphite (by mass percentage content, 40% of small-sized particles with a particle size D50 of 5 μm and 60% of large-sized particles with a particle size D50 of 25 μm) and Si (with a particle size D50 of 5 μm) were mixed in a mass ratio of 50:50 to obtain a negative electrode active material.

Characterization and Tests

The following characterization and tests were carried out on the examples and comparative examples:

(1) Capacity Test

The secondary battery was charged to 4.3 V at a constant current rate of 0.33 C at 25° C., then charged to a current of 0.05 C at the constant voltage, allowed to stand for 5 min, and then discharged to 2.5 V at a constant current rate of 0.33 C; and the discharge capacity at this time was recorded, which was the discharge capacity at 0.33 C.

(2) Rate Performance Test

The secondary battery of the examples and comparative examples was charged to 4.3 V at a constant current rate of 0.33 C at 25° C., then charged to a current of 0.05 C at the constant voltage, allowed to stand for 5 min, and then discharged to 2.5 V at a constant current rate of 0.1 C; and the discharge capacity at this time was recorded, which was the discharge capacity at 0.33 C; and the secondary battery was allowed to stand for 30 min, then charged to 4.3 V at a constant current rate of 1.0 C, then charged to a current of 0.05 C at the constant voltage, allowed to stand for 5 min, and then discharged to 2.5 V at a constant current rate of 1 C; and the discharge capacity at this time was recorded, which was the discharge capacity at 1 C.

Rate performance of battery: capacity retention rate=1 C/0.33 C (%)=discharge capacity at 1 C/discharge capacity at 0.33 C×100%.

TABLE 1

| | Carbon-based raw material | | | | | Silicon-based |
|---|---|---|---|---|---|---|
| | Type | Particle size of large-sized particles/μm | Particle size of small-sized particles/μm | Proportion of large-sized particles/% | Proportion of small-sized particles/% | raw material Particle size/μm |
| Example 1 | Artificial graphite | 25 | 5 | 60 | 40 | 5 |
| Example 2 | Artificial graphite | 25 | 5 | 60 | 40 | 5 |
| Example 3 | Artificial graphite | 25 | 5 | 60 | 40 | 5 |

TABLE 1-continued

| | Carbon-based raw material | | | | | Silicon-based raw material |
|---|---|---|---|---|---|---|
| | Type | Particle size of large-sized particles/μm | Particle size of small-sized particles/μm | Proportion of large-sized particles/% | Proportion of small-sized particles/% | Particle size/μm |
| Example 4 | Artificial graphite | 25 | 5 | 60 | 40 | 5 |
| Example 5 | Artificial graphite | / | 5 | 0 | 100 | 5 |
| Example 6 | Artificial graphite | 25 | / | 100 | 0 | 5 |
| Example 7 | Artificial graphite | 25 | 5 | 60 | 40 | 0.2 |
| Example 8 | Artificial graphite | 25 | 5 | 60 | 40 | 100 |
| Example 9 | Natural graphite | 95 | 1 | 20 | 80 | 30 |
| Example 10 | Hard carbon | 50 | 5 | 50 | 50 | 50 |
| Comparative example 1 | Artificial graphite | 25 | 5 | 60 | 40 | 5 |

TABLE 2

| | Carbon-based material | | | Silicon-based material | | |
|---|---|---|---|---|---|---|
| | Functional group on surface | Charge | Proportion/% | Functional group on surface | Charge | Proportion/% |
| Example 1 | Amino group | Positive | 50 | Carboxyl group | Negative | 50 |
| Example 2 | Carboxyl group | Negative | 50 | Amino group | Positive | 50 |
| Example 3 | Amino group | Positive | 97 | Carboxyl group | Negative | 3 |
| Example 4 | Amino group | Positive | 20 | Carboxyl group | Negative | 80 |
| Example 5 | Amino group | Positive | 50 | Carboxyl group | Negative | 50 |
| Example 6 | Amino group | Positive | 50 | Carboxyl group | Negative | 50 |
| Example 7 | Amino group | Positive | 50 | Carboxyl group | Negative | 50 |
| Example 8 | Amino group | Positive | 50 | Carboxyl group | Negative | 50 |
| Example 9 | Boric acid group | Positive | 5 | Sulfonic acid group | Negative | 95 |
| Example 10 | Amide group | Positive | 70 | Bromine atom | Negative | 30 |
| Comparative example 1 | / | / | 50 | / | / | 50 |

TABLE 3

| | Capacity at 0.33 C/Ah | Capacity at rate of 1 C/Ah | Capacity retention rate/% |
|---|---|---|---|
| Example 1 | 101.2 | 92.1 | 91.0 |
| Example 2 | 101.0 | 90.1 | 89.2 |
| Example 3 | 96.7 | 90.1 | 93.2 |
| Example 4 | 102.7 | 90.8 | 88.4 |
| Example 5 | 99.8 | 94.2 | 94.4 |
| Example 6 | 100.5 | 90.7 | 90.2 |
| Example 7 | 99.6 | 89.3 | 89.7 |
| Example 8 | 99.4 | 88.2 | 88.7 |
| Example 9 | 100.7 | 88.9 | 88.2 |

TABLE 3-continued

| | Capacity at 0.33 C/Ah | Capacity at rate of 1 C/Ah | Capacity retention rate/% |
|---|---|---|---|
| Example 10 | 92.3 | 78.4 | 84.9 |
| Comparative example 1 | 102.7 | 89.2 | 86.9 |

By analyzing the data in Table 3, it can be seen that, compared with example 1, the negative electrode active materials in example 2 have opposite charges, and the silicon-based material is positively charged and the carbon-based material is negatively charged. The agglomeration of silicon has a greater negative impact on the performance of a battery than the agglomeration of carbon, which is especially more obvious in a high-silicon system. Therefore, when the silicon content in the negative electrode active material is up to 50%, the application of the solution of example 1 in which silicon is negatively charged and carbon is positively charged has more obvious advantages than the solution of example 2 in which silicon is positively charged and carbon is negatively charged, since the solution in which silicon is negatively charged and carbon is positively charged can effectively improve the agglomeration of silicon and conductive agent. In example 3, the silicon content is low, and although the capacity retention rate is improved compared with example 1, the capacity at 0.33 C of the battery prepared under the same conditions is too low. In example 4, the silicon content is too high, and the dispersion is more difficult than in example 1, and although the capacity at 0.33 C is improved to a certain extent, the capacity retention rate is significantly decreased. In example 5, all the carbon materials are small-sized particles, and since the small-sized particles have many defects, resulting in a low specific capacity, the capacity at 0.33 C is also lower than that of example 1. In example 6, due to the use of carbon materials being large-sized particles, the kinetics of the battery deteriorates, and various performances decrease compared with example 1. In example 7, silicon has a smaller particles size, which aggravates the agglomeration and decreases the capacity retention rate. In example 8, silicon has a larger particles size, which also deteriorates the kinetics and results in a decrease in various performances.

Examples 9 and 10 show that the solution of the present application is applicable to different types of functional groups.

In comparative example 1, the surfaces of the carbon-based raw material and the silicon-based raw material are not treated, which results in serious agglomeration after mixing, leading to a significant decrease in capacity retention rate compared with those of examples, which greatly reduces the rate performance of the battery.

The various technical features of the above embodiments can be combined in any manner, and in order to simplify the description, not all possible combinations of the various technical features of the above embodiments are described. However, the technical features should be considered to be within the scope of the description in the specification, as long as there is no conflict between the combinations of the technical features.

The embodiments described above merely illustrate several implementations of the present application and are described relatively specifically and in detail, but should not be construed as limiting the patent scope of the present application. It should be noted that several variations and improvements may also be made by those of ordinary skill in the art without departing from the concept of the present application, and should fall within the scope of protection of the present application. Therefore, the scope of protection of the present application shall be subject to the appended claims.

What is claimed is:

1. A negative electrode active material, comprising a carbon-based material and a silicon-based material, wherein a first functional group exists on a surface of the carbon-based material, a second functional group exists on a surface of the silicon-based material, and the first functional group has a charge opposite to that of the second functional group;

the carbon-based material comprises small-sized particles and large-sized particles, the small-sized particles have a particle size D50 of 0.2 μm-9.9 μm, and the large-sized particles have a particle size D50 of 10 μm-100 μm.

2. The negative electrode active material according to claim 1, wherein the first functional group has a positive charge, and the second functional group has a negative charge.

3. The negative electrode active material according to claim 1, wherein the first functional group includes one or more of an amino group, an amide group, a cyano group and a boric acid group.

4. The negative electrode active material according to claim 1, wherein the second functional group includes one or more of a carboxyl group, a sulfonic acid group, a hydroxyl group and a halogen group.

5. The negative electrode active material according to claim 1, wherein a mass percentage content of the silicon-based material in the negative electrode active material is 1%-99%; and optionally, the mass percentage content of the silicon-based material in the negative electrode active material is 25%-85%.

6. The negative electrode active material according to claim 1, wherein a mass percentage content of the carbon-based material in the negative electrode active material is 1%-99%; and optionally, the mass percentage content of the carbon-based material in the negative electrode active material is 15%-75%.

7. The negative electrode active material according to claim 1, wherein a mass percentage content of the small-sized particles in the negative electrode active material is 1%-99%, and a mass percentage content of the large-sized particles in the negative electrode active material is 1%-99%; and optionally, the mass percentage content of the small-sized particles in the negative electrode active material is 5%-75%, and the mass percentage content of the large-sized particles in the negative electrode active material is 25%-95%.

8. The negative electrode active material according to claim 1, wherein the silicon-based material has a particle size D50 of 0.2 μm-100 μm; and optionally, the silicon-based material has a particle size D50 of 0.2 μm-30 μm.

9. The negative electrode active material according to claim 1, wherein the negative electrode active material satisfies at least one of the following conditions (1) to (2):

(1) a concentration of a stable aqueous dispersion of the carbon-based material is 0.1 mg/mL-100 mg/mL; and (2) a concentration of a stable aqueous dispersion of the silicon-based material is 0.1 mg/mL-100 mg/mL;

wherein the stable aqueous dispersion refers to a liquid phase obtained by solid-liquid separation of a dispersion which uses water as a solvent and stands for more than 2 h after preparation without precipitation.

10. A method for preparing a negative electrode active material, the method comprising:

mixing a carbon-based raw material, a first surfactant and a solvent to prepare a first dispersion, allowing same to stand for more than 2 h, then subjecting same to solid-liquid separation, and retaining a liquid phase to obtain a first stable dispersion; centrifuging the first stable dispersion to obtain a first precipitate; and washing and drying the first precipitate to obtain the carbon-based material;

mixing a silicon-based raw material, a second surfactant and a solvent to prepare a second dispersion, allowing same to stand for more than 2 h, then subjecting same to solid-liquid separation, and retaining a liquid phase to obtain a second stable dispersion; centrifuging the second stable dispersion to obtain a second precipitate; and washing and drying the second precipitate to obtain the silicon-based material; and mixing the carbon-based material and the silicon-based material to prepare the negative electrode active material;

wherein the first surfactant and the second surfactant respectively have opposite charges in the solvent, wherein a first functional group exists on a surface of the carbon-based material, a second functional group exists on a surface of the silicon-based material, and a charge of the first functional group is opposite to a charge of the second functional group, wherein the carbon-based material comprises small-sized particles and large-sized particles, the small-sized particles have a particle size D50 of 0.2 μm-9.9 μm, and the large-sized particles have a particle size D50 of 10 μm-100 μm.

11. The method according to claim 10, wherein the method satisfies at least one of the following conditions (1) to (5):

(1) the carbon-based raw material includes one or more of artificial graphite, natural graphite, soft carbon and hard carbon;

(2) the silicon-based raw material includes one or more of Si and $SiO_x$ (0<x<2);

(3) the first surfactant and the second surfactant are each independently selected from one or more of: dodecylamine, hexadecylamide, dodecanitrile, diglyceride ethoxyborate, sodium cholate, sodium dodecylbenzene sulfonate, decynediol and hexadecyl bromide;

(4) an amount of the first surfactant is 0.1%-40% of a mass of the carbon-based raw material; and (5) an amount of the second surfactant is 0.1%-40% of a mass of the silicon-based raw material.

12. A secondary battery, comprising a positive electrode plate, a negative electrode plate, and a separator provided between the positive electrode plate and the negative electrode plate, wherein the negative electrode plate comprises a negative electrode current collector and a negative electrode active material layer provided on at least one surface of the negative electrode current collector, and the negative electrode active material layer comprises the negative electrode active material of claim 1.

13. A method for preparing a secondary battery, the method comprising:

providing a positive electrode current collector, coating a positive electrode slurry on a surface of the positive electrode current collector, and drying and pressing same to obtain a positive electrode plate;

providing a negative electrode current collector, coating a negative electrode slurry on a surface of the negative electrode current collector, and drying and pressing same to obtain a negative electrode plate; wherein the negative electrode slurry comprises a negative electrode active material; and optionally, the negative electrode slurry has a solid content of 30%-70%; and laminating or winding the positive electrode plate, a separator and the negative electrode plate to prepare the secondary battery, wherein the negative electrode active material comprises a carbon-based material and a silicon-based material, a first functional group exists on a surface of the carbon-based material, a second functional group exists on a surface of the silicon-based material, and the first functional group has a charge opposite to that of the second functional group;

the carbon-based material comprises small-sized particles and large-sized particles, the small-sized particles have a particle size D50 of 0.2 μm-9.9 μm, and the large-sized particles have a particle size D50 of 10 μm-100 μm.

14. A power consuming device, comprising a secondary battery of claim 12.

* * * * *